United States Patent
Tang et al.

(10) Patent No.: US 11,462,986 B2
(45) Date of Patent: Oct. 4, 2022

(54) LINEAR VIBRATION MOTOR WITH MAGNETS FIXED TO A BASE AND COILS FIXED TO A WEIGHT

(71) Applicant: AAC Technologies Pte. Ltd., Singapore (SG)

(72) Inventors: Yun Tang, Shenzhen (CN); Lubin Mao, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 390 days.

(21) Appl. No.: 16/705,265

(22) Filed: Dec. 6, 2019

(65) Prior Publication Data

US 2020/0212782 A1    Jul. 2, 2020

(30) Foreign Application Priority Data

Dec. 27, 2018 (CN) .......................... 201822221439.3

(51) Int. Cl.
*H02K 33/14* (2006.01)
*H02K 33/18* (2006.01)
*B06B 1/04* (2006.01)

(52) U.S. Cl.
CPC ............. *H02K 33/18* (2013.01); *H02K 33/14* (2013.01); *B06B 1/045* (2013.01)

(58) Field of Classification Search
CPC ......... H02K 33/18; H02K 33/14; H02K 35/04
See application file for complete search history.

(56) References Cited

U.S. PATENT DOCUMENTS

| 5,587,615 | A  | * | 12/1996 | Murray | H02K 33/16 310/15 |
| 2004/0095035 | A1 | * | 5/2004 | Sogabe | H02K 1/146 310/186 |
| 2020/0044544 | A1 | * | 2/2020 | Tang | H02K 33/18 |

FOREIGN PATENT DOCUMENTS

| CN | 206023536 B1 | 3/2017 | |
| CN | 206060496 B1 | 3/2017 | |
| CN | 108880169 A * | 11/2018 | ............. H02K 33/16 |
| WO | WO-2017061740 A1 * | 4/2017 | ............. H02K 33/02 |

OTHER PUBLICATIONS

Oh (WO 2017061740 A1) English Translation (Year: 2017).*
PCT search report dated Jan. 15, 2020 by SIPO in related PCT Patent Application No. PCT/CN2019/111296 (5 Pages).

* cited by examiner

*Primary Examiner* — Tulsidas C Patel
*Assistant Examiner* — Robert E Mates
(74) *Attorney, Agent, or Firm* — W&G Law Group

(57) ABSTRACT

An embodiment of the invention provides a linear vibration motor. The linear vibration motor includes a base with a containing space, a vibration unit arranged in the containing space, an elastic piece suspending the vibration unit in the containing space, and a magnet assembly fixed to the base and driving the vibration unit to vibrate. The vibration unit includes a weight, a containing groove penetrating through the weight and at least one pair of coils which are oppositely fixed to the weight. The magnet assemblies has two magnets which are respectively fixed on two opposite sides of the base. The two magnets are at least partially located in the containing grooves, and are magnetized in the vibration direction. Compared with the related art, the linear vibration motor is improved in vibration performance and reliability.

6 Claims, 3 Drawing Sheets

LINEAR VIBRATION MOTOR WITH MAGNETS FIXED TO A BASE AND COILS FIXED TO A WEIGHT

FIELD OF THE PRESENT DISCLOSURE

The present disclosure relates to the field of electrical transducers, more particularly to a linear vibration motor in a mobile device, for converting electrical signals into tactile feedbacks.

DESCRIPTION OF RELATED ART

With the development of electronic technology, portable consumer electronic products, such as mobile phones, handheld game consoles, navigation devices or handheld multimedia entertainment devices are more and more popular. These electronic products generally use linear vibration motors to perform system feedback, such as phone call prompt, information prompt, navigation prompt, vibration feedback of game machines, etc. Such a wide range of applications requires that the vibration motor has excellent performance and long service life.

The linear vibration motor of the related technology comprises a base with a containing space, a vibration unit located in the containing space, an elastic piece for fixing the vibration unit and suspending the vibration unit in the containing space, and a coil fixed to the base. A magnetic field generated by electrification of the coil interacts with a magnetic field generated by the vibration unit to drive the vibration unit to do reciprocating rectilinear motion to generate vibration.

However, in the related linear vibration motor, the driving force of the vibration unit is only generated by a coil, that is, the vibration unit only vibrates in a driving mode by using Lorentz force, and the vibration effect is limited.

Therefore, it is necessary to provide a new linear vibration motor to solve the above technical problems.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

Figure 1:
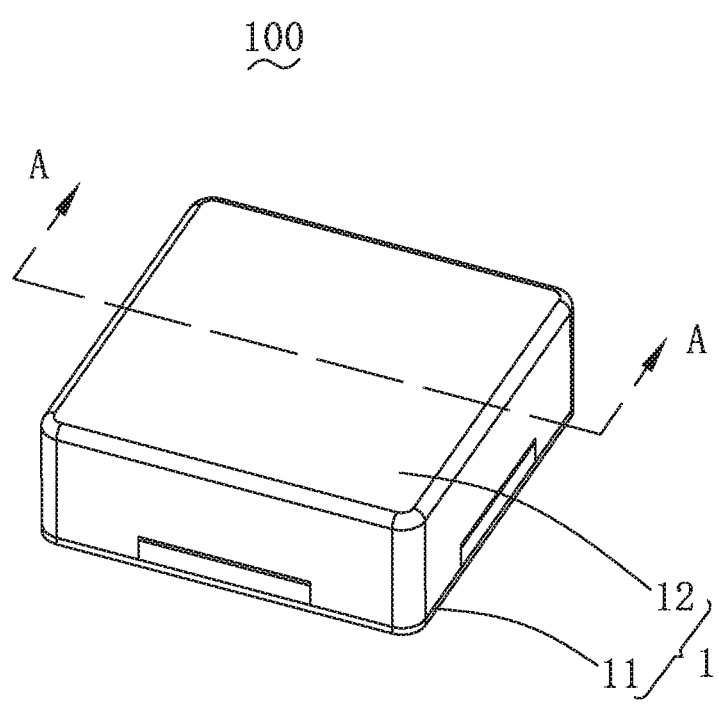
FIG. 1 is an isometric view of a linear vibration motor in accordance with an exemplary embodiment of the present disclosure.
Figure 2:
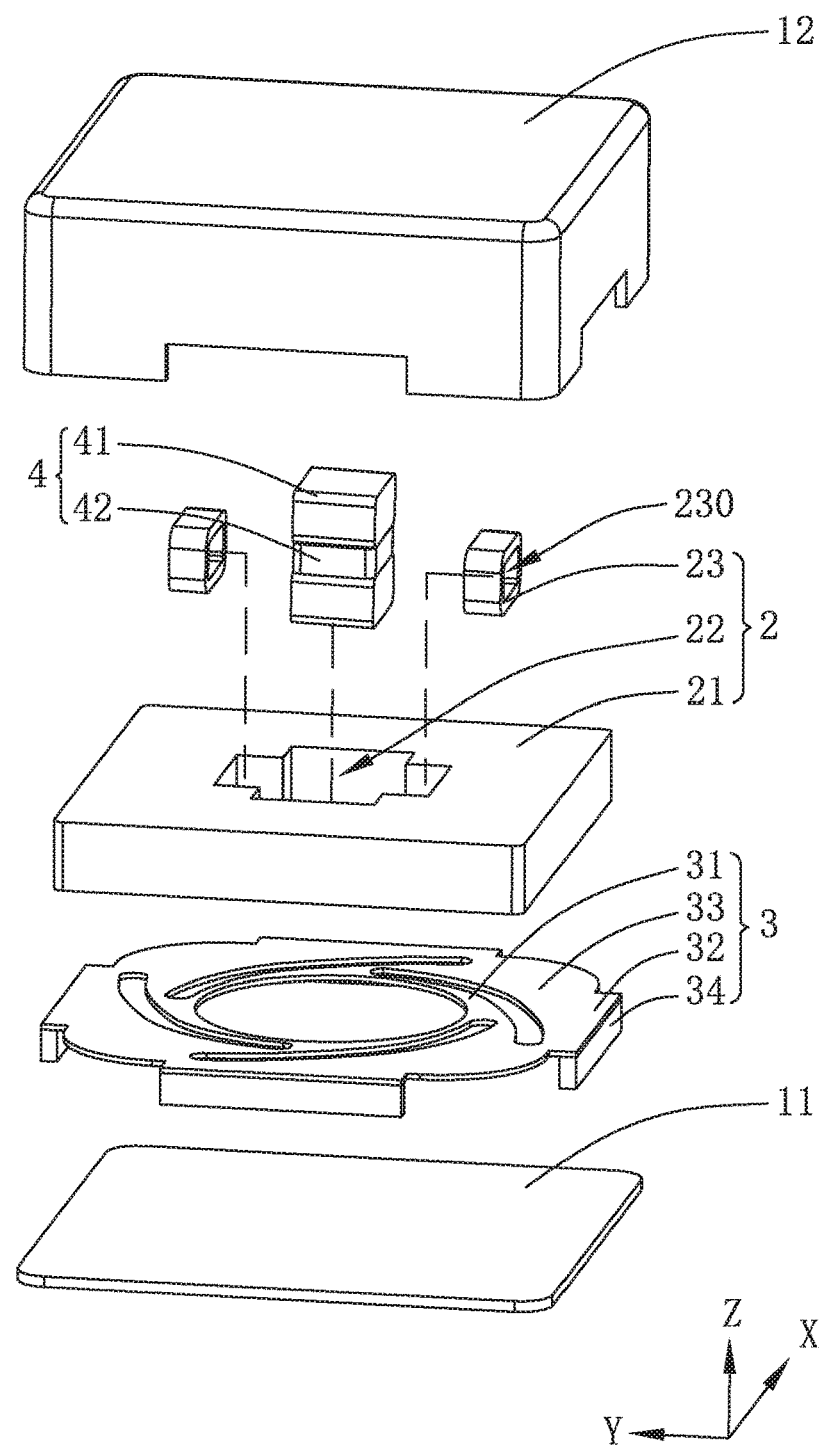
FIG. 2 is an exploded view of the linear vibration motor in FIG. 1.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Referring to FIGS. 1-4, an exemplary embodiment of the present invention provides a linear vibration motor 100. The linear vibration motor 100 comprises a base 1, a vibration unit 2, an elastic piece 3 and a magnet assembly 4.

The base 1 is provided with an accommodating space 10 for accommodating the vibration unit 2, the elastic piece 3 and the magnet assembly 4 therein.

The base 1 comprises a base plate 11 and a cover plate 12 which engages with the base plate 11 for forming the accommodating space cooperatively.

The vibrating unit 2 is disposed in the accommodating space 10. The elastic piece 3 suspends the vibration unit 2 in the accommodating space and provides the vibration unit 2 with a vibration condition. In the embodiment, the elastic piece 3 is located on one side of the vibration unit 2 along a vibration direction and is connected with the vibration unit 2 to perform a z-axis direction vibration structure in the vertical direction. The magnet assembly 4 is fixed to the base 1.

Specifically, the vibrating unit 2 comprises a weight 21, a containing groove 22 penetrating the weight 21 along the vibrating direction of the vibrating unit 2, and at least one coil 23 arranged in the containing groove 22 for being fixed to the weight 21. When an amount of the coil 23 is two or more, the coils 23 are spaced from each other with a distance therebetween. The coil 23 is used for driving the vibration unit 2 to vibrate, and a through hole 230 formed by winding of the coil 23 faces the magnet assembly 4.

The amount of the coils 23 is not limited as described above. For example, in the embodiment, the amount of the coils 23 is two, and the two coils 23 are respectively fixed to the weight 21. Meanwhile, the two coils 23 are respectively located on two opposite sides of the vibration unit 2 along the vibration direction (i.e., the z-axis direction). The weight 21 is provided with a fixing groove 211 and a fixing platform 212. An amount of the fixing grooves 211 here is at least two, thus the two fixing grooves are respectively arranged corresponding to the two coils 23.

Further, the two fixing grooves 211 are formed by downward sinking relative to the two opposite sides of the containing groove 22, and the two coils 23 are respectively fixed in the two fixing grooves 211.

The fixing platform 212 is formed by extending from one end, close to the elastic piece 3, of the weight 21 along a direction toward the elastic piece 3. The fixing platform 212 extends along a periphery of the containing groove 22, and the two coils 23 are respectively fixed in the two fixing grooves 211.

Further, a thickness of the coil 23 is equal to a depth of the fixing groove 211, by which the coil 23 will not occupy the space of the containing groove 22 after the coil 23 is installed in the fixing groove 211, so that the magnet assembly 4 can be designed to be larger and provide greater driving force. Accordingly, the vibration effect is improved.

The elastic piece 3 comprises a ring-shaped first fixing arm 31, a ring-shaped second fixing arm 32, a spring arm 33 connecting the first fixing arm 31 to the second fixing arm 32, and a reinforcing arm 34.

The first fixing arm 31 is arranged around the periphery of the containing groove 22 and is fixedly connected with the weight 21. Specifically, the first fixing arm 31 is sleeved on and fixed with the fixing platform 212, and meanwhile, the spring arm 33 is suspended by the first and second fixing arms.

The second fixing arm 32 is connected to the base 1, and the elastic arm 33 is suspended and is used for providing a vibration restoring force and a supporting force to the vibration unit 2.

The reinforcing arm 34 is formed by bending and extending from the periphery of the second fixing arm 32. The reinforcing arm 34 is fixedly connected with the base 1, and therefore the reliability of the first fixing arm 31 is improved.

The magnet assembly 4 includes two magnets 41 fixed to two opposite sides of the base 1 along the vibration direction and an iron core 42 sandwiched between the two magnets 41. One of the magnets is fixed on the base plate 11; the other of the magnets is fixed on the upper cover 12. The two magnets 41 are at least partially located in the containing groove 22 and are spaced from the coil 23. The iron core 42 is spaced from the coil 23, and is aligned with the through hole 230 of the coil 23.

In the embodiment, the two magnets 41 are magnetized in the vibration direction (z-axis direction) and the magnetic poles are arranged opposite to each other.

Figure 3:
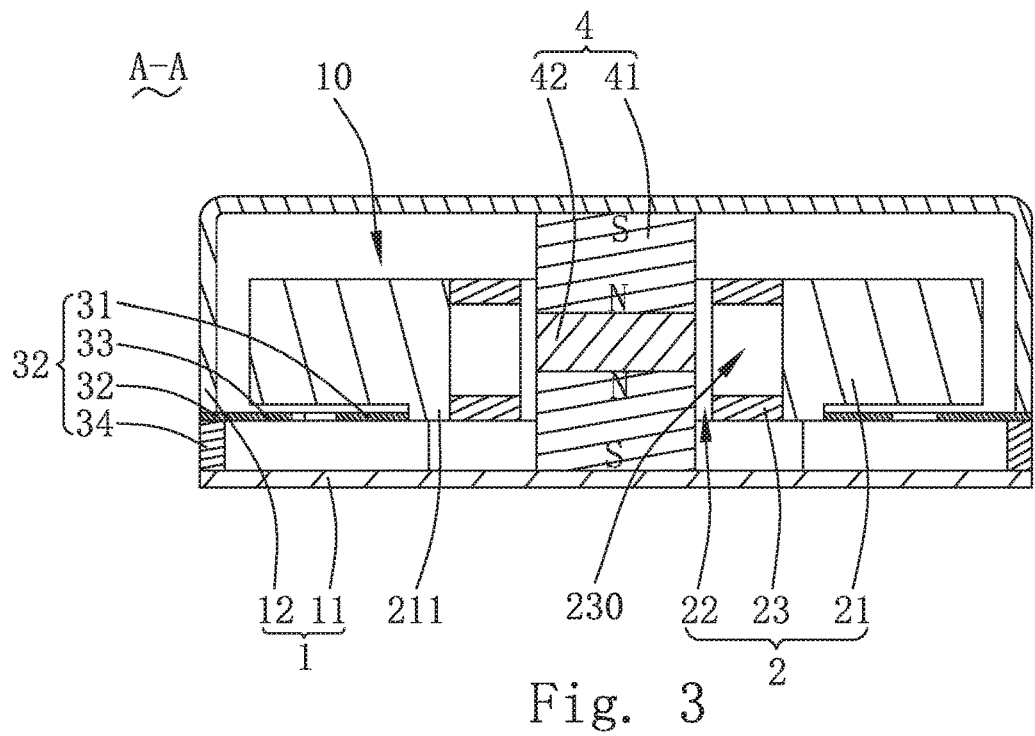
FIG. 3 is a cross-sectional view of the linear vibration motor, taken along line A-A in FIG. 1.
Figure 4:
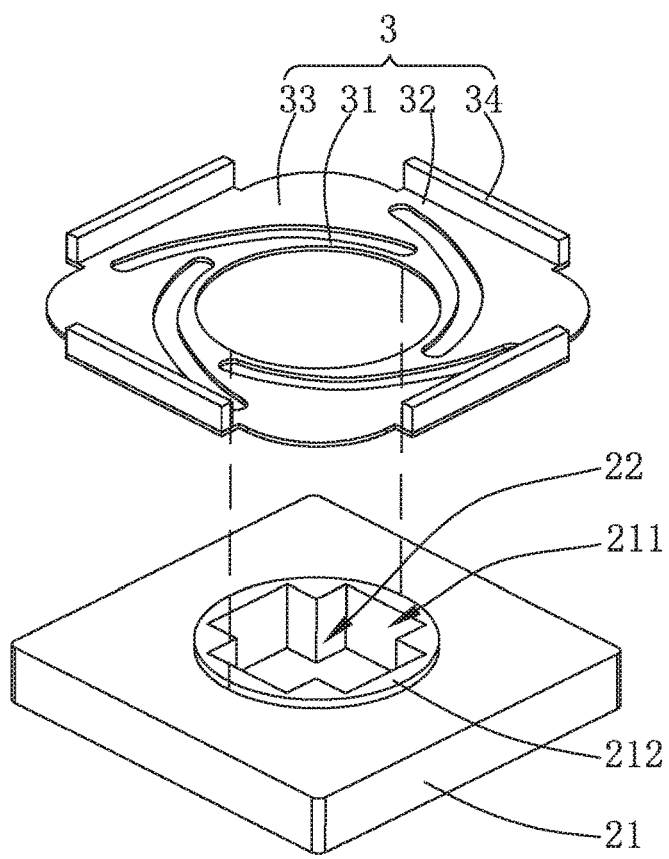
FIG. 4 is a partially assembled view of the linear vibration motor in FIG. 2.

In the above-described structure, as further illustrated in FIG. 3, the magnetic poles of the two magnets 41 close to one side of the iron core 42 are N poles, and the magnetic poles far away from one side of the iron core 42 are S poles. The magnetic force lines of the N poles of the two magnets 41 respectively penetrate the coil 23 to form a magnetic circuit, thereby increasing the Lorentz Force generated between the coil 23 and the magnet 41. Accordingly, the driving effect achieved by the vibration unit 2 is stronger, and the vibration effect of the linear vibration motor 100 is improved.

By virtue of additional the iron core 42, the magnetic force lines generated by N poles of the two magnets 41 are collected, the magnetic force lines penetrating through the coil 23 are more concentrated, and the magnetic field intensity of the magnetic field environment of the coil 23 is effectively increased, by which the Lorentz Force generated between the coil 23 and the magnet 41 is increased, and a stronger driving effect is achieved.

Compared with the related art, the vibration unit comprises a weight, a containing groove penetrating the weight, at least one pair of coils which are oppositely arranged in the containing groove and are respectively fixed to the weight, and a through hole formed by each coil, and a magnet assembly. Two magnets are respectively fixed on two opposite sides of the base in the vibration direction. The two magnets are at least partially located in the containing groove and spaced from the coils. The two magnets are magnetized in the vibration direction and the magnetic poles are arranged oppositely. The magnetic force lines generated by the magnetic poles in the containing groove respectively penetrate through the coil to form a magnetic loop, thereby increasing the Lorentz Force is generated between the coil and the magnet after the coil is electrified. The driving effect achieved by the vibration unit is stronger, and the vibration effect of the linear vibration motor is improved.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor, comprising:
a base with an accommodating space;
a vibration unit located in the accommodating space, including a weight, a containing groove penetrating the weight along a vibration direction of the vibration unit, at least one pair of coils oppositely spaced from each other in the containing groove and respectively fixed to the weight, each of the coils forming a through hole;
a magnet assembly fixed to the base for driving the vibration unit to vibrate, including two magnets respectively fixed on two opposite sides of the base along the vibration direction of the vibration unit, each magnet being at least partially accommodated in the containing groove and aligned with but spaced from one corresponding through hole formed by one of the respective coils;
an elastic piece for suspending the vibration unit in the accommodating space located on one side of the vibration unit along the vibration direction of the vibration unit; wherein
the two magnets are magnetized along the vibration direction and the two magnets each having magnetic poles arranged opposite to each other, the magnet assembly further comprises an iron core sandwiched between the two magnets, and the iron core keeps a distance from the pair of coils, the through hole of one of the respective coils is disposed opposite to the iron core.

2. The linear vibration motor as described in claim 1, wherein the weight further comprises two fixing grooves recessed outwards from two opposite sides of the containing groove; each of the two coils is respectively fixed in a corresponding one of the fixing grooves.

3. The linear vibration motor as described in claim 2, wherein a depth of each respective fixing groove is equal to a thickness of the respective coil.

4. The linear vibration motor as described in claim 1, wherein the elastic piece comprises a ring-shaped first fixing arm, a ring-shaped second fixing arm and a spring arm connecting the first fixing arm to the second fixing arm; the first fixing arm is arranged around a periphery of the containing groove and is fixedly connected with the weight, the second fixing arm is connected to the base for suspending the spring arm.

5. The linear vibration motor as described in claim 4, wherein the elastic piece further comprises a reinforcing arm bending and extending from a periphery of the second fixing arm, and the reinforcing arm connects to the base.

6. The linear vibration motor as described in claim 3, wherein the weight includes a fixing platform protruding from one end thereof adjacent to the elastic piece toward the elastic piece, the fixing platform extends along the periphery of the containing groove, and the first fixing arm is sleeved on the fixing platform for fixing the first fixing arm.

* * * * *